(12) United States Patent
van Ooij et al.

(10) Patent No.: US 8,029,906 B2
(45) Date of Patent: Oct. 4, 2011

(54) SILANE COMPOSITIONS AND METHODS FOR BONDING RUBBER TO METALS

(75) Inventors: William J. van Ooij, Fairfield, OH (US); Max Sorenson, Salt Lake City, UT (US); Matthew B. Stacy, Cincinnati, OH (US)

(73) Assignees: University of Cincinnati, Cincinnati, OH (US); Ecosil Technologies LLC, Fairfield, OH (US)

( * ) Notice: Subject to any disclaimer, the term of this patent is extended or adjusted under 35 U.S.C. 154(b) by 0 days.

(21) Appl. No.: 12/844,543

(22) Filed: Jul. 27, 2010

(65) Prior Publication Data

US 2010/0291382 A1 Nov. 18, 2010

Related U.S. Application Data

(63) Continuation of application No. 12/411,184, filed on Mar. 25, 2009, now abandoned, which is a continuation of application No. 10/681,422, filed on Oct. 8, 2003, now abandoned.

(51) Int. Cl.
| | |
|---|---|
| B32B 15/06 | (2006.01) |
| B32B 15/04 | (2006.01) |
| B05D 1/38 | (2006.01) |
| C08K 3/36 | (2006.01) |
| C09J 183/00 | (2006.01) |
| C08L 83/00 | (2006.01) |

(52) U.S. Cl. ..... 428/450; 156/329; 427/405; 427/407.1; 427/409; 427/413; 427/419.8; 428/447; 428/448; 524/492; 524/493; 528/38

(58) Field of Classification Search .......... None
See application file for complete search history.

(56) References Cited

U.S. PATENT DOCUMENTS

| | | | |
|---|---|---|---|
| 3,088,847 A | 5/1963 | Pines | |
| 5,958,161 A | 9/1999 | Grimberg et al. | |
| 6,132,808 A | 10/2000 | Brown et al. | |
| 6,268,421 B1 | 7/2001 | Dittrich et al. | |
| 6,361,592 B1 | 3/2002 | Song et al. | |
| 6,409,874 B1 | 6/2002 | Van Der Aar et al. | |
| 6,416,869 B1 * | 7/2002 | van Ooij et al. | 428/450 |
| 6,475,300 B2 * | 11/2002 | Shimakura et al. | 148/247 |
| 6,756,079 B2 * | 6/2004 | van Ooij et al. | 427/409 |

FOREIGN PATENT DOCUMENTS

| | | |
|---|---|---|
| DE | 10015308 A1 | 10/2001 |
| EP | 0816420 A1 | 1/1998 |
| EP | 1157146 A1 | 11/2001 |
| WO | WO 0063462 A1 * | 10/2000 |
| WO | 2006063303 A1 | 6/2006 |

OTHER PUBLICATIONS

Product Information for Snowtex colloidal silica, provided by Nissan Chemical, 2001-2004.*
Senthil K. Jayaseelan et al., Rubber-to-metal bonding by silanes, J. Adhesion Sci, Technol., vol. 15, No. 8 (2001), pp. 967-991.
Product information for Snowtex colloidal silica, provided by Nissan Chemical, 2007.
PCT, PCT/US2004/033346, International Search Report, Nov. 9, 2005.
PCT, PCT/US2004/033346, Written Opinion of the International Search Authority, Nov. 9, 2005.
Office Action issued in Chinese Patent Application No. 2004800357259, mailed Mar. 1, 2010.
Office Action issued in Chinese Patent Application No. 2004800357259, mailed Jul. 2, 2009.
Office Action issued in Chinese Patent Application No. 2004800357259, mailed Oct. 22, 2008.

* cited by examiner

*Primary Examiner* — Michael J Feely
(74) *Attorney, Agent, or Firm* — Wood, Herron & Evans, LLP

(57) ABSTRACT

Compositions and methods for treating metal substrates and/or bonding metal substrates to polymeric materials, such as rubber, are provided. The compositions include at least one substantially hydrolyzed amino silane and at least one substantially hydrolyzed sulfur-containing silane Optionally, the compositions include a nano-size particulate material. The compositions provide coatings on metal substrates for protecting the metal from corrosion and for adhering rubber-like polymeric compositions to the metal with polymer-to-metal vulcanization conditions less dependent on the coating thickness, and with use of less coating materials.

18 Claims, 1 Drawing Sheet

SILANE COMPOSITIONS AND METHODS FOR BONDING RUBBER TO METALS

CROSS REFERENCE TO RELATED APPLICATIONS

This application is a continuation of U.S. application Ser. No. 12/411,184, filed Mar. 25, 2009 (abandoned), which is a continuation of U.S. application Ser. No. 10/681,422, filed Oct. 8, 2003 (abandoned), the disclosures of which are hereby incorporated by reference herein.

BACKGROUND OF THE INVENTION

I. Field of the Invention

The present invention relates to silane coatings for treating metals. More particularly, the present invention provides organofunctional silane coatings which improve the adhesion of rubber and other polymeric materials to a metal substrate.

II. Description of the Prior Art

Rubber to metal bonded components find two major areas of application which may be classified as tire and non-tire applications. In tires, traditionally brass is used as a thin coating over a steel cord for imparting adhesion to natural rubber compounds. Non-tire applications include components, such as vibration dampers on motor and engine mounts, and applications in the medical, appliance, and other industries, where basic functions such as fluid control, energy conversion, sealing, vibration isolation, and/or combinations of these functions are required. Additionally, tire-to-metal metallic reinforcement of conveyer belts and hoses is a further example of an industrial application where a rubber substrate needs to be adhesively bound to an associated metal.

Many different systems and methods have been proposed to adhere rubber, or other polymeric materials, to metals. For example, organofunctional silanes have been found to promote adhesion between a metal substrate and a polymer layer. Silanes have been particularly useful in tire applications where strong and reliable bonds are critical. However, adhesion or bond strength is typically dependent upon the particular silane or combination of silanes, and the particular system upon which the silanes are used to coat the metal. In other words, the amount of adhesion provided by a particular silane coating typically depends on the metal substrate as well as the polymer layer to be adhered thereto. For example, while certain silanes may provide improved adhesion between the metal substrate and a peroxide-cured rubber, these same silanes will often not provide the same results for sulfur-cured rubber.

Hydrophobic silanes, such as alkoxy silanes, have been proposed to provide good bond strength between rubbers and metal. However, formulations of such silane solutions require flammable organic solvents for dissolution, leading to more viscous solutions and thicker final coatings. Such coatings are difficult to apply, cure, and control, particularly for coating uniformity, and need to be dried, prior to bonding to the rubber, at elevated temperatures, such as about 160° C. which pose additional hazards from flammable solvents. Bond strength with these silane coatings are predominantly optimal with coating thicknesses of at least 1 μm. Such coatings are not very amenable to industrial applications, and tire-cord applications in particular, where efficiency in time and cost is important to the success of the products.

Further, it has been difficult to bond rubbers to metal substrates utilizing various silanes and combinations thereof, and especially in those instances in which the adhesively-bound surfaces are subjected to fuels, oils, and/or other organic solvents, as the silanes may react therewith and/or dissolve therein to weaken or degrade the adhesive bond. Solvent-based adhesive systems are used in non-tire applications for bonding metals to rubbers. However, solvent-based adhesives are flammable, and hence hazardous, generate high levels of volatile organic compounds and vapors, and pose environmental disposal problems. These disadvantages render these systems less useful in industrial applications.

In rubber compounds, adhesion promoters such as cobalt salt additives and HRH systems (hexamethylenetetramine, resorcinol and hydrated silica) are used to further enhance rubber adhesion to metals, and particularly for tire cords. More specifically, cobalt additives improve the aged adhesion and dynamic adhesion properties of the rubber-brass bond. Although the performance of the rubber-to-metal bond is adequate for most applications, inclusion of such promoters presents drawbacks. For example, cobalt salts are expensive and pose availability problems. Further, cobalt has been found to affect the rubber properties upon aging, and in particular, cobalt causes accelerated degradation of the rubber.

Rubber to metal bonded applications in tires have further drawbacks. For example, the brass plating process sometimes involves treatment with hazardous chemicals, such as cyanide. Additionally, brass is prone to galvanic erosion in conjunction with the underlying steel, and furthermore, the brass composition typically requires a copper content of about 63-68% which imposes restrictions on the rubber composition. These limitations further require consideration when selecting an appropriate adhesive and/or bonding method for bonding rubber, or other tire materials, to the metal tire cord.

Thus, there is a need for compositions and methods for improving the adhesion between a metal substrate and a polymeric material, such as rubber. There is a further need to provide the bond without the use of promoters in the polymeric material, and in particular, without the use of cobalt. There is yet a further need to provide a bonding method that is safe and convenient, while reducing risks associated with use of hazardous solvents.

SUMMARY OF THE INVENTION

The present invention provides improved silane compositions and methods for coating metal substrates and bonding polymeric materials, such as rubber, to metal substrates while using less silane materials, thinner silane coatings, and providing strong rubber-to-metal bonds with vulcanization conditions less dependent on the thickness of the silane coating than previously believed necessary with traditional silane compositions and methods. The silane compositions and methods are useful in a variety of applications including coatings for protecting metal substrates from damage, such as corrosion, and adhesives to efficiently and economically adhere polymeric compositions to coated metal surfaces with minimal waste of the silane composition. The invention is also amenable for industrial scale of the applications.

The silane compositions comprise at least one substantially hydrolyzed amino-silane and at least one substantially hydrolyzed sulfur-containing silane. Silanes can generally be hydrolyzed in water or mixtures of organic solvents. The silanes are hydrolyzed substantially, i.e., a majority of their silyl-alkoxide groups (Is-OR) are hydrolyzed to the corresponding silanol (Is-OH). Such silanes reduce the hydrophobicity of the coating without a reduction in bond strength. It is thought that the available silanol groups of hydrolyzed silanes readily bond to metal substrates and polymeric materials in the form of siloxanes to enhance bond strength.

Suitable "substantially hydrolyzed" aminosilanes include, without limitation, a substantially hydrolyzed aminosilane of the general formula I:

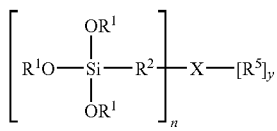

wherein:
each R1, independently, is selected from the group consisting of substituted or unsubstituted, straight, branched or cyclic C1-C20 alkyl, alkenyl, and alkynyl groups and substituted or unsubstituted C3-C20 aryl and alkylaryl groups;
each R2, independently, is selected from the group consisting of hydrogen, substituted or unsubstituted, straight, branched or cyclic C1-C20 alkyl, alkenyl, and alkynyl groups and substituted or unsubstituted C3-C20 aryl and alkylaryl groups; X is selected from the group consisting of

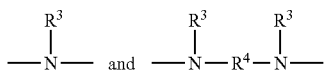

wherein each R3, independently, is selected from the group consisting of hydrogen, substituted or unsubstituted, straight, branched or cyclic C1-C20 alkyl, alkenyl, and alkynyl groups and substituted or unsubstituted C3-C20 aryl and alkylaryl groups; and
R4 is selected from the group consisting of hydrogen, substituted or unsubstituted, straight, branched or cyclic C1-C20 alkyl, alkenyl, and alkynyl groups and substituted or unsubstituted C3-C20 aryl and alkylaryl groups; R5 is selected from the group consisting of hydrogen, substituted or unsubstituted, straight, branched or cyclic C1-C20 alkyl, alkenyl, and alkynyl groups and substituted or unsubstituted C3-C20 aryl and alkylaryl groups; n is an integer selected from the group consisting of 1 and 2; and y is (2−n).
Examples of suitable aminosilane include, without limitation, bis(trimethoxysilylpropyl)ethylene diamine, bis(trimethoxysilylpropyl)amine, N-methyl-aminopropyltriethoxysilane, and a combination thereof.
Suitable "substantially hydrolyzed" sulfur-containing silanes include, without limitation, a substantially hydrolyzed sulfur-containing silane of the general formula II

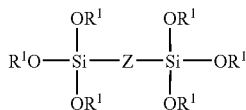

wherein:
each R1, independently, is selected from the group consisting of substituted or unsubstituted, straight, branched or cyclic C1-C20 alkyl, alkenyl, alkynyl, and acetyl groups and substituted or unsubstituted C3-C20 aryl and alkylaryl groups;
Z is -Q-Sx-Q, wherein each Q, independently, is an aliphatic or aromatic group; and
x is an integer from 2-10.
Examples of suitable sulfur-containing silanes include, without limitation, bis(trimethoxysilylpropyl)disulfide, bis(trimethoxysilylpropyl)tetrasulfide, and a combination thereof.

The silane compositions may further include nano-sized particulate material. The nano-sized particulate material provides improved rubber-to-metal bonding while reducing the need for inclusion of adhesion promoters in the rubber composition. The nano-size particulate material may be, for example, silica, zinc oxide, or a combination thereof and may be used in a concentration ranging from at least about 1 ppm to about 10% by weight of the composition applied to the metal substrate. In one embodiment of the invention, the nano-sized particulate material is silica and in a concentration range from about 50 ppm to about 1000 ppm of the solution. In another embodiment, the nano-sized particulate material is silica and in a concentration range from about 80 ppm to about 200 ppm of the solution.

The aminosilane(s) and sulfur-containing silane(s) may be hydrolyzed individually or collectively with a suitable solvent and combined with the nano-size particulate material to form a final "hydrolyzed" solution applied to the metal substrate. In one embodiment of the invention, the solution applied has an aminosilane to sulfur-containing silane concentration ratio of about 4:1 to about 1:4, and in another embodiment, the concentration ratio is about 1:1. The solution is applied to at least a portion of the surface of the metal substrate and dried in air, at room temperature or with heat for example, to form a coating on the metal. The coating so formed should have a thickness of about 1 μm or less and advantageously, a thickness of about 0.2 μm to about 0.6 μm.

In accordance with the invention, the coated metal may be adhered to a polymeric material, such as a rubber composition, by applying the polymeric material in an uncured state onto the coated portion of the metal, and curing the polymeric material thereon to bond it to the metal. Where rubber compositions are used, the uncured rubber, after application to the coated metal, is vulcanized to cure the rubber while simultaneously bonding it to the metal.

The silane coatings provide many advantages including protection of the metal from environmental factors that generally cause the metal to corrode. Other advantages of the silane coatings are realized in their application to metal substrates and bonding of same to polymeric materials. Coatings having a thickness of about 1 μm or less provide good bond strength and bonding characteristics when the coated metal is bonded to a polymeric material while minimizing waste of valuable silane materials. The silane compositions of the prior art generally required a coating thickness of greater than 1 μm to provide good bonding characteristics. Thinner coatings also allow for added control in application generally leading to a more uniform coating, which enhances bond strength and bonding properties. Moreover, it has been found that thinner coatings reduce or eliminate the dependency of the vulcanization conditions, and the vulcanization pressure in particular, on the coating thickness.

The silane compositions and methods of the invention have applications in a wide variety of areas. For example, the invention may have application in tire and non-tire industries. In tires, the invention may be used to bond tire cords, typically steel cords, to natural or synthetic rubber compounds. In non-tire applications, the invention may be useful in vibration dampers on motor and railroad engine mounts, in tire-to-metal metallic reinforcement of conveyer belts and hoses, and in the medical, appliance, and other industries where basic functions such as fluid control, energy conversion, sealing, vibration isolation, and/or combinations of these functions are required. In bonding applications, the silane compositions of the invention provide adhesion to polymeric materials, such as rubber, without the need to include adhesion promoters, such as cobalt additives, in the polymeric composition.

These and other objectives and benefits of the present invention shall be further appreciated from the detailed description of exemplary embodiments below.

BRIEF DESCRIPTION OF THE DRAWINGS

The accompanying drawings which are incorporated in and constitute a part of this specification, illustrate bonding results of embodiments of the invention and, together with the general description given above, serve to further explain the invention.

DETAILED DESCRIPTION OF EXEMPLARY EMBODIMENTS OF THE INVENTION

Figure 1:
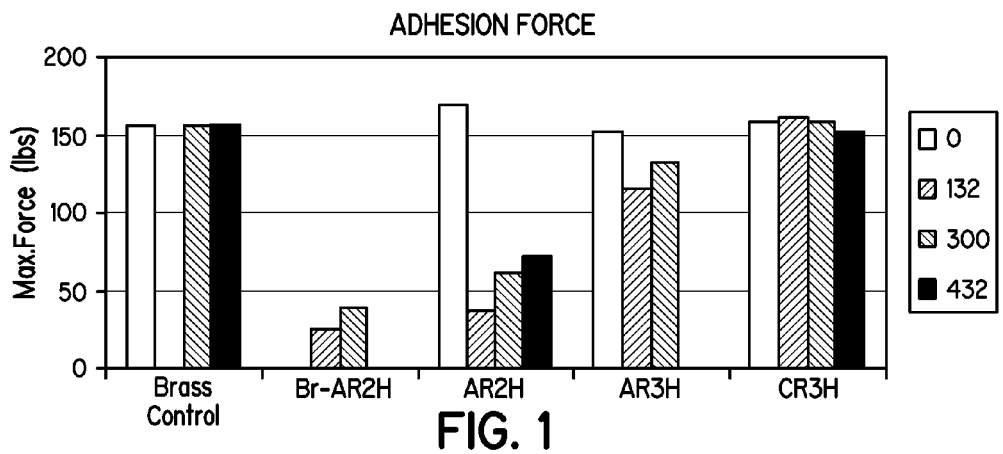
FIG. 1 is a bar graph illustrating the adhesion force of rubber-to-brass bonds utilizing silane compositions of the invention.

The present invention provides compositions and methods for treating a metal substrate and bonding polymeric materials to the metal substrate to provide improved adhesion therebetween. The compositions comprise at least one substantially hydrolyzed amino silane and at least one substantially hydrolyzed sulfur-containing silane. The compositions may further include at least one nano-size particulate material. The compositions may be used to treat a metal substrate by applying a coating of the composition, as a solution comprising the substantially hydrolyzed amino silane and the substantially hydrolyzed sulfur-containing silane to at least a portion of the surface of the metal substrate, and drying the solution on the metal surface to form a coating or film having a thickness of between about 0.1 μm to about 1 μm thereon. Thus, the invention also provides coatings for metal substrates, for protecting metals from damage such as corrosion, and coated metal substrates.

In another aspect of the invention, the composition is used to bond a polymeric material, such as a rubber, to a metal substrate by applying an uncured polymeric material to the metal surface, treated or coated with the silane composition thereon, and curing the polymeric material to bond it to the metal substrate.

The compositions and methods of the present invention have many uses, including applications involving bonding rubber compositions to metals in tire cords and non-tire products, as discussed in the background section of the invention. Particularly, in bonding polymeric materials and/or rubber compositions to metals, the invention provides good adhesion and bond strength efficiently and economically, with minimal waste of the silane solution. The coatings provided by the compositions are generally thinner than that found to be necessary in the prior art and still provide strong bonds. The coatings also lack the silane hydrophobicity previously believed necessary for strong bonds. Thus, the invention provides good rubber-to-metal bonding with use of less silane composition, and with the vulcanization conditions, and the vulcanization pressure in particular, being less dependent on, or independent of, the thickness of the silane coating. More specifically, the compositions provide strong rubber-to-metal bonds at vulcanization pressures lower than typically necessary with conventional compositions and methods. Further, the compositions eliminate the need for adhesion-enhancing cobalt additives in the rubber or polymeric composition. Thus, the invention overcomes many of the disadvantages of silane compositions and solutions and methods of the prior art.

A variety of different metals may be treated and/or bonded to polymeric materials, such as rubber, with the compositions of the invention. Examples of the metals include, without limitation, zinc and zinc alloys, such as titanium-zinc (zinc which has a very small amount of titanium added thereto), zinc-nickel alloys, and zinc-cobalt alloys; metal substrates having zinc-containing coatings, such as galvanized steel and electrogalvanized steel, and similar types of coated metals; steel and in particularly, cold rolled steel (CRS) and carbon steel; aluminum and aluminum alloys; copper and copper alloys, such as brass; and tin and tin alloys, including metal substrates such as CRS having tin-containing coatings.

The silane compositions are generally solutions applied to the metal substrates and comprise one or more substantially hydrolyzed amino silanes, one or more substantially hydrolyzed sulfur-containing silanes, and at least one nano-size particulate material. As used herein, the term "substantially hydrolyzed" means that a majority of the alkoxide (—OR) groups on an unhydrolyzed silane compound are converted to the corresponding hydroxide groups (—OH). For example, the "substantially hydrolyzed" silanes of the solutions of the present invention have at least a majority portion (and preferably all or substantially all) of the silyl substituted R1 groups replaced by a hydrogen atom. It is believed that the hydroxide groups of the hydrolyzed silane react with metal oxides and hydroxides, generally present on the metal surface, to create a covalent bond between the metal and the silane, thereby enhancing adhesion. Similarly, it is believed that the metal-silane complex bonds to polymeric materials and compositions, such as rubber, through nucleophilic Michael additions by the sulfur atoms in the sulfur-containing silane, respectively, to reactive double bonds (Michael acceptors) in the polymeric material.

Hydrolyzed amino silanes may be obtained commercially or prepared in the laboratory by hydrolyzing an "unhydrolyzed" amino silane compound. For example, amino silanes having a general formula 1

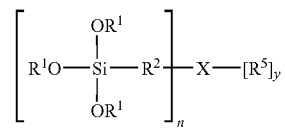

wherein each R1, independently, is selected from the group consisting of substituted or unsubstituted, straight, branched, or cyclic C1-C20 alkyl, alkenyl, and alkynyl groups and substituted or unsubstituted C3-C20 aryl and alkylaryl groups; each R2, independently, is selected from the group consisting of hydrogen, substituted or unsubstituted, straight, branched or cyclic C1-C20 alkyl, alkenyl, and alkynyl groups and substituted or unsubstituted C3-C20 aryl and alkylaryl groups.

X is selected from the group consisting of

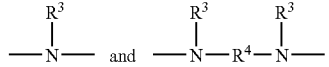

wherein each R3, independently, is selected from the group consisting of hydrogen, substituted or unsubstituted, straight, branched or cyclic C1-C20 alkyl, alkenyl, and alkynyl groups and substituted or unsubstituted C3-C20 aryl and alkylaryl groups; and R4 is selected from the group consisting of hydrogen, substituted or unsubstituted, straight, branched or cyclic C1-C20 alkyl, alkenyl, and alkynyl groups and substituted or unsubstituted C3-C20 aryl and alkylaryl groups; R5 is selected from the group consisting of hydrogen, substituted or unsubstituted, straight, branched or cyclic C1-C20 alkyl, alkenyl, and alkynyl groups and substituted or unsubstituted C3-C20 aryl and alkylaryl groups; n is an integer selected from the group consisting of 1 and 2; and y is (2–n).

For example, bis-silyl aminosilanes having two tri-substituted silyloxy groups, wherein the substituents are individually chosen from the group consisting of alkoxy, aryloxy, and acyloxy, may be employed in the present invention. Thus, suitable bis-silyl aminosilanes may have the general structure:

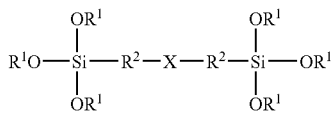

wherein each R1 is chosen from the group consisting of C1-C20 alkyl and C2-C20 acyl. Each R1 may be the same or different. However, in the hydrolyzed silane solution, at least a majority portion (and preferably all or substantially all) of the R1 groups are replaced by a hydrogen atom. Advantageously, each R1 is individually chosen from the group consisting of ethyl, methyl, propyl, isopropyl, butyl, iso-butyl, sec-butyl, tert-butyl, and acetyl;

Each R2 group may be a same or different, substituted or unsubstituted aliphatic or aromatic group. Advantageously, each R2 group, independently, is chosen from the group consisting of: C1-C20 alkylene, C1-C20 alkenylene, C3-C20 arylene, and C3-C20 alkylarylene; and X is selected from the group consisting of

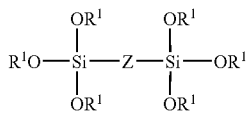

wherein R3 and R4 are as defined above.

Exemplary bis-silyl aminosilanes, suitable for the present invention, include bis(trimethoxysilylpropyl)amine (for example, sold by Osi Specialties, Inc. under the trade name A-1170), bis-(triethoxysilylpropyl)amine, bis-(triethoxysilylpropyl)ethylenediamine (a non-commercial product prepared by Osi Specialties, Inc. under the name Y9400), and N-methyl-aminopropyltriethoxysilane. Additional suitable aminosilanes are disclosed in U.S. Pat. No. 6,409,874, which disclosure is incorporated herein by reference in its entirety.

Suitable sulfur-containing silanes are compounds of the general formula 2:

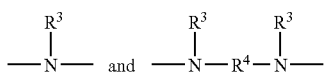

wherein each R1 group, independently, is selected from the group consisting of substituted or unsubstituted, straight, branched or cyclic C1-C20 alkyl, alkenyl, alkynyl, and acetyl groups and substituted or unsubstituted C3-C10 aryl and alkylaryl groups;

Z is -Q-Sx-Q, wherein each Q group, independently, is an aliphatic or aromatic group; and x is an integer from 2-10.

Thus, bis-silyl polysulfur silanes may be employed in the solutions utilized in the present inventions. An example of a suitable bis-silyl polysulfur silanes includes bis-(trialkoxysilylpropyl)sulfides having 2-10 sulfur atoms. For example, bis-(trimethoxysilylpropyl)di-sulfide is suitable and available from Osi Specialties, Inc. under the trade name A1589. Bis-(triethoxysilylpropyl) tetrasulfide (also referred to as bis-(triethoxysilylpropyl)sulfane or "TESPT") is commercially available from Osi Specialties, Inc. One suitable form of TESPT is A-1289 available from Osi Specialties, Inc. Commercially available forms of TESPT, however, are actually mixtures of bis-(triethoxysilylpropyl)sulfides having 2-10 sulfur atoms. In other words, commercially available forms of TESPT have a distribution of sulfide chain links, with the S3 and S4 sulfides predominating. Thus, the present methods may include hydrolyzed silane solutions containing mixtures of bis-silyl polysulfur silanes in combination with one or more bis-silyl aminosilanes. Additional suitable sulfur-containing silanes are disclosed in U.S. Pat. No. 6,409,874.

The amino silane(s) and the sulfur-containing silane(s) may be independently hydrolyzed and/or mixed with at least one nano-sized particulate material and hydrolyzed to form the final silane solution. Generally, alkoxy-substituted silanes, such as trialkoxy aminosilanes and trialkoxy sulfur-containing silanes, are readily hydrolyzed in the presence of water ranging from a mildly acidic pH, such as a pH of between about 3 and about 7 and form silanol groups, i.e., SiOH. Hydrolysis generally occurs efficiently within this pH range of about 3-7. However, at pH's above or below this range, the silanol so formed readily self-condenses to form a siloxane. In the condensation process, the hydroxyl groups of the adjacent molecules react with one another to eliminate molecules of water (condensation) and result in a cross-linked siloxane structure containing —Si—O—Si— functionality which is typically not useful for treating metals and/or bonding rubber and other polymeric compositions to metal substrates due to high insolubility in water. 5% water solutions are generally sufficient to substantially hydrolyze the silanes.

To accelerate silane hydrolysis and avoid silane condensation during hydrolysis, the pH of the silane solution may be maintained below about 7, and advantageously in the mildly acidic range from about 4 to about 6.5 (particularly for hydrolysis of the bis-silyl aminosilanes). To this end, the pH of the hydrolysis solution may be adjusted by the addition of one or more compatible acids. For example, organic acids such as acetic acid, oxalic acid, formic acid, propionic acid, and isopropionic acid, and inorganic acids such as phosphoric acid, may be added to the hydrolyzing solution to adjust the pH. Sodium hydroxide, or other compatible bases, may also be used, when needed, to raise the pH of the silane solution. Some silanes provide a mildly acidic pH solution when mixed with water and may not need a pH adjustment to accelerate hydrolysis. The pH ranges discussed with respect to preparing the silane-hydrolyzing solutions should not be confused with the pH of the final silane solution applied to the metal substrate.

The hydrolyzing silane solutions may further include one or more of compatible solvents due to poor solubilities of some silanes in water, and more particularly, sulfur-containing silanes in water. Alcohols are generally suitable for solubilizing and hydrolyzing the silanes Suitable alcohols include, without limitation, methanol, ethanol, n-propanol, isopropanol, n-butanol, sec-butanol, tert-butanol, and longer aliphatic alcohols. For polysulfur silanes, the nature and amount of solvent(s) employed will typically depend upon the concentration of the polysulfur silanes. Thus, the hydrolysis solution should include sufficient solvent to solubilize the polysulfur silanes. The ratio of water to solvent in the hydrolyzed silane solution (as applied to the metal substrate, by volume) may be between about 1:99 and about 99:1, and advantageously between about 1:1 and about 1:20.

Alternatively, sulfur-containing silanes may be hydrolyzed without employing an organic solvent. For example, polysulfur silanes may be hydrolyzed in a solution prepared as an emulsion in water or an inorganic solvent and without inclusion of an organic solvent. The silanes are simply mixed with water in a suitable surfactant known to those skilled in the art. An emulsified, hydrolyzed solution of a bis-silyl polysulfur silane can be prepared, for example, by mixing a 5% solution of the silane in water along with 0.2% of a surfactant, by volume. Suitable surfactants include, for example, sorbitan fatty acid esters, such as SPAN® 20 available from ICI Americas, Inc. Once the emulsion of the polysulfur silane has been prepared, it may simply be mixed with one or more substantially hydrolyzed aminosilanes, as described above, and one or more nano-sized particulate material and then applied to the metal substrate.

It is advantageous, but not required, that the amino silane (s) and the sulfur-containing silane(s) are hydrolyzed separately to form the final silane solution to be applied to the metal substrate. Thus, one or more amino silanes, such as the bis-silyl aminosilanes described above, may be hydrolyzed, individually or together, by mixing them with water, and a suitable compatible solvent if necessary, at the desired concentration. Generally, hydrolysis of the bis-silyl aminosilane proceeds to completion without an organic or inorganic solvent. Similarly, one or more sulfur-containing silanes, such as bis-silyl polysulfur silanes, may be hydrolyzed, individually or together, in water and a compatible organic or inorganic solvent, for solubility purposes, at a desired concentration. Where included, the nano-sized particulate material(s) may be mixed together with the combined substantially hydrolyzed amino-silane and substantially hydrolyzed sulfur-containing silane.

To prepare the final silane solution, the individual aminosilane and sulfur-containing silane solutions may be stirred for a period of time, such as at least 24 hours, to ensure complete or "substantial" hydrolysis of the silane(s). For bis-silyl polysulfur silanes, it may be necessary to allow the hydrolysis to proceed for several days, such as 3 to 4 days or even more, for "substantial" hydrolysis. Once the individual silane solutions have been separately hydrolyzed, they are mixed with one another, along with the nano-size particulate material(s) where included, to form the final silane solution for application on the metal substrate. Mixtures of hydrolyzed silanes are generally stable for at least up to 30 days, and therefore, may be prepared in advance, and need not be used immediately after preparation. Advantageously, the hydrolyzed silane mixtures should be stored at chilled temperatures, such as in a refrigerator at about 4° C. or below to prolong the stability of the silane solution.

The individually hydrolyzed aminosilane(s) and sulfur-containing silane(s) solutions may have different silane concentrations, which may vary significantly from the desired overall silane concentration in the final, mixed silane solution applied to the metal substrate. Therefore, it may be more efficient if the silane concentrations in the individual hydrolyzed solutions are approximately the same as the desired silane concentration so that upon mixture of the individual silane solutions, the final applied solution has the desired silane concentration. This simplifies the preparation of the final silane solution. As one of ordinary skill in the art readily appreciates, the final mixed silane solution may be prepared simply by mixing the appropriate ratios of the individual silane solutions, along with the nano-sized particulate material.

It has been found that inclusion of nano-size particulate material in the final silane solution results in coatings and films, when dried, that are capable of strongly bonding rubber and other polymeric materials to metals at vulcanization pressures and heat lower than that traditionally utilized for adhesives and methods of the prior art. Particularly, inclusion of nano-size particles has improved rubber-to-metal bond strength to such degree that the polymeric material or rubber no longer needs adhesion-enhancing cobalt additives for superior adhesion. Suitable nano-size particulate materials include, without limitation, one or a combination of nano-size silica particles, nano-size zinc oxide particles, and nano-size aluminum oxide particles. Nano-size silica particles have been shown to provide good adhesive bonding and coating properties for the silane solution. In one embodiment of the present invention, the nano-size particulate material has an average particle size of less than about 0.1 μm, and in another embodiment, an average particle diameter of about 0.03 μm to about 0.05 μm. Nano-size silica particles suitable for the present invention may be purchased commercially from Aldrich Chemical Company.

Generally, the final hydrolyzed silane solution applied to the metal substrate may vary in silane concentration and ratio (aminosilane to sulfur-containing silane) over a wide range and still provide beneficial results. The final silane solution should have a total silane concentration of at least about 0.1% by volume, i.e., the concentration of the combination of amino silanes and sulfur-containing silanes in the final solution. Solutions having a silane concentration of between about 0.1% and about 10% by volume generally provide good bonding without wasting valuable silanes.

The ratio of the amino silanes to the sulfur-containing silanes in the final silane solution may vary from one extreme to another, such as a ratio of amino silane(s) to sulfur-containing silane(s) between about 1:99 and about 99:1, and still provide good results. For bonding rubber or other polymeric materials to metals, a ratio between about 1:10 and about 10:1 may be suitable. In one embodiment of the invention, the final solution includes an amino silane to sulfur-containing ratio in the range from about 1:3 to about 3:1, by volume. In another embodiment, the ratio is about 1:1 by volume.

The concentration of the nano-size particulate materials in the final silane solution is generally reflective of the ultimate bonding properties and protection for the coated metal substrate. The concentration of the nano-size particulate material may vary depending upon application of the final silane solution. For example, concentration ranges from at least about 10 ppm (parts per million) up to about 1% by weight in the solution are suitable for bonding applications. In one embodiment of the invention, the nano-size particulate material is silica at a concentration range from about 10 ppm to about 1,000 ppm in the applied silane solution. In another embodiment, the particulate material is silica at a concentration range from about 50 ppm to about 200 ppm in the applied solution. In yet another embodiment, the particulate material is silica in a concentration range from about 80 ppm to about 120 ppm in the applied solution. The concentration may be the concentration of a combination of nano-size materials. Concentrations below about 10 ppm and above about 1% by weight generally do not provide advantages over prior art solutions in terms of bond strength and adhesion.

The pH of the final silane solution, when applied to the metal substrate, may be the same as, or different from, the pH during hydrolysis and silane solution preparation. When used to improve the adhesion of a rubber (particularly sulfur-cured rubber) to a metal, the pH of the final solution may be between about 4 and about 7, and advantageously between about 4 and 5. The pH of the final silane solution may be adjusted in the manner previously described.

The metal surface to be treated or coated with the final silane solution should be cleaned and prepared prior to application of the solution. For example, solvent and/or alkaline cleaning techniques are well known to those skilled in the art and are suitable for cleaning the metal surface. Cleaning the surface will generally allow better wetting and, thus, better bonding of the dried coated film onto the metal.

Application of the final silane solution to at least a portion of the metal surface may be accomplished by various methods and techniques known in the art. For example, the metal may be dipped into the solution (also referred to as rinsing), or the solution may be sprayed, brushed on or even painted onto the surface of the metal. When dipping is employed, the duration of dipping generally affects the resulting film thickness. Accordingly, the contact time between the solution and the metal should be sufficient to ensure coating of the metal. Depending upon the solution concentration, contact times of between about 1 second to about 30 minutes are generally sufficient. For 5% silane solutions, contact times of at least about 5 seconds should suffice, however, contact times of about 30 seconds are advantageous. Further, the metal substrate may be "contacted" with the solution a plurality of times over a period of time to increase the thickness of the resulting coating or film thereon.

To form the coating or film on the metal substrate, the silane solution, applied to the metal surface, may be dried, such as by air at room temperature or with heat at elevated temperatures, to evaporate the water and/or organic or inorganic solvents in the solution. Heat may be necessary depending on the particular silanes used and their ratio and concentration in the applied solution. Generally, where the silane coating is used to bond rubber or other polymeric compounds and promote adhesion to the coated metal substrate, heating is not advised since it is preferred that the solution or coating on the metal remain only partially cross-linked. While heat drying (or curing) promotes cross-linking, too much cross-linking in the silane coating may prevent sufficient adhesion between a rubber and the metal substrate. The amount of cross-linking, however, may be tailored to suit one's particular needs (such as the desired bond strength between the metal substrate and rubber). Suitable drying methods are disclosed in U.S. Pat. No. 6,409,874. Once dried, the coated metal may be shipped to an end user or even stored for later use.

One of the many benefits of the present invention is that the film or coating thickness may be less than about 1 µm and still provide a strong bond between polymeric materials, such as rubber, and metals. Moreover, the thickness of coatings formed from the silane solutions no longer influences the vulcanization pressure to the degree previously found necessary to bond the polymer to the metal. In other words, with coatings thinner than about 1 µm, the vulcanization pressure is now less dependent on, and may even be independent of, the thickness of the coating. Accordingly, it was found that the substantially hydrolyzed silane compositions of the invention may be utilized in thinner films to provide good bonding at lower vulcanization pressures. Thinner films also provide a more economical adhesion system by using less silane materials and reducing waste. Further, with thinner coatings, there is generally more control over the thickness, and therefore the uniformity, of the coating which, in turn, generally further reduces waste and enhances bond strength.

As discussed above, coating thickness may be determined by the concentration of the silane solution and length of contact time between the solution and the metal. For example, a 5% silane solution contacted with the metal for at least about 30 seconds generally provides a film thickness of about 0.3 µm to about 0.4 µm after drying. In one embodiment of the invention, the coating is formed to a thickness in the range from about 0.1 µm to about 1 µm after drying, and in another embodiment, to a thickness of about 0.2 µm to about 0.6 µm after drying.

The silane coatings of the present invention also provide corrosion resistance, which is useful especially during shipping and/or storage of the metal. The coating is relatively permanent and is generally non-removable prior to bonding of a polymeric material or rubber to the underlying metal substrate. Thus, the end user, such as an automotive manufacturer, may apply a polymeric material (such as a paint, an adhesive, or a rubber) directly on top of the silane coating without additional treatment, such as the application of chromates or solvent-based adhesives. The silane coatings not only provide a surprisingly high degree of adhesion to the polymeric material, but also prevent delamination even where a portion of the base metal is exposed to the atmosphere and corroded thereunder.

The silane compositions and solutions provided by invention are useful for bonding polymeric materials, such as rubber, to metals. The term "rubber" as used herein, is used generically and includes a whole host of conventionally known and utilized polymeric and elastomeric compositions. Examples of rubbers that may be bonded to metals using the present methods include, without limitation, natural rubbers (NR), and synthetic rubbers such as NBR and SBR. Examples of synthetic rubbers include polyisoprene, polybutadiene, polychloroprene, butyl rubber, styrene-butadiene co-polymers, acrylonitrile-butadiene-styrene co-polymers, EPDM (ethylene-propylene-diene)terpolymers, and the like. These rubbers may be cross-linked, for instance, under the action of sulfur, peroxides, or bis-maleimides, with or without sulfur. The rubber composition may comprise a single rubber compound or a mixture of two or more rubber compounds of the same type or different types.

The rubber composition, bonded to the metal using the present methods, may further include known additives common to rubber compositions, such as: reinforcing carbon blacks; inactive fillers such as calcium carbonates, chalks, talcs, or metal oxides; accelerator systems; vulcanization retarders; promoters such as zinc oxide or stearic acid; plasticizers such as aromatic, paraffinic, naphthenic and synthetic mineral oils; aging, light-protecting ozone-protecting, fatigue, coloration, and processing auxiliaries; and sulfur. These additives may be used in a quantity of about 0.1 parts to about 80 parts by weight per 100 parts by weight of the rubber composition.

The uncured rubber is applied to the metal substrate directly on top of the silane coating, and is then cured in the typical fashion, i.e., using the cure conditions required for the particular rubber composition employed to bond the rubber to the metal substrate underneath. Milder vulcanization conditions, particularly lower vulcanization pressures, may be sufficient to adequately adhere the rubber composition to the coated metal substrate. Even previously cured rubber may be adhered to the metals using the silane coatings of the present invention simply by applying the cured rubber compound directly on top of the silane coating and thereafter applying sufficient pressure, and generally heat, to adhere the rubber to the silane coating. Vulcanization conditions are well known in the art for such bonding methods.

The silane compositions and coatings comprising a substantially hydrolyzed bis-silyl amino silane, a substantially hydrolyzed bis-silyl polysulfur silane, and a nano-size particulate material, provide improved rubber adhesion, particularly with sulfur-cured rubber compositions. These results are beneficial as coatings of either hydrolyzed silane alone did not provide good adhesion to sulfur-cured rubber. An added benefit of the improved adhesion provided by the hydrolyzed silane coatings is that cobalt adhesion promoters may be eliminated from the rubber composition and, in particular, from sulfur-cured rubbers.

The hydrolyzed silane compositions and methods of the invention have many advantages in use. For example, manufacturers need not use different silane solutions for corrosion protection, for paint adhesion, for adhesion to peroxide-cured rubber, and for adhesion to sulfur-cured rubbers, as the present silane compositions provide all of this with good adhesion to the sulfur-cured rubber. The benefits and advantages of treating metal substrates and bonding polymeric materials, such as rubbers, to metal substrates using the methods and the hydrolyzed silane compositions of the present invention will be further appreciated in light of the following examples.

EXAMPLES

To assess the efficacy of silane coatings of the present invention in bonding rubbers to metal surfaces, a series of tests were performed with test specimens utilizing the standard ASTM 429-B test. Brass and zinc-plated brass metal substrates (1" wide, 3" long panels or coupons) were coated with silane solutions having differing ratios of the aminosilane to sulfur-containing silane, and adhered to natural rubber in a vulcanization process. The natural rubber compositions were sulfur-cured compositions, representative of a typical tire-cord skim composition, either with a cobalt adhesion promoter or without a cobalt adhesion promoter.

The silane solutions were prepared to the indicated concentration (by volume) by mixing the silane with alcohol (methanol or ethanol) and an amount of water equivalent to the percent silane concentration. For example, a 5% A1170 (ethanol) solution was prepared by mixing 5% A1170, 5% water and 90% ethanol (by volume). The pH was adjusted to about 4 by adding an amount of acetic acid as needed. Solutions of A1170 (bis-trimethoxysilylpropyl amine) and A1289 (bis-triethoxysilylpropyl tetrasulfide) were prepared and hydrolyzed separately in the same manner, i.e., 5% silane, 5% water, and 90% alcohol, by volume. Both hydrolysis solutions were stirred for at least 24 hours in order to substantially hydrolyze the silane. After hydrolysis, the two silane solutions were combined in either a 1:1, 1:2 or a 1:3 ratio of A1170:A1298, and then mixed with a solution containing nano-size colloidal silica particles to form test solution "A". Similarly, Y9400 (a bis-(triethoxysilylpropyl)ethylene diamine available from OSi Specialties, Inc.) and A1589 (a bis-(triethoxysilylpropyl)disulfide available from OSi Specialties, Inc.) were individually, substantially hydrolyzed, combined in either a 1:1 or 1:3 ratio by volume, and mixed with the nano-size particulate silica suspension to form test solution "C". The silica suspension was prepared by mixing 400 mg of nano-sized particulate silica, available from Aldrich Chemical Co., in 100 ml of water. Five ml of this suspension was substituted for 5 ml of water in each test solution. The total concentration of silane in solutions A and C, as applied to the metal substrates, was 5%.

Thus, "AR2H" is a test solution "A" having 5% by volume of substantially hydrolyzed A1170 and A1289 silanes in a ratio of 1:1; "AR3H" is a test solution "A" having 5% by volume of substantially hydrolyzed A1170 and A1289 silanes in a ratio of 1:3; and "CR3H" is a test solution "C" having 5% by volume of substantially hydrolyzed Y9400 and A1589 silanes in a ratio of 1:3. Each of test solutions "A" and test solutions "C" contained nano-size colloidal silica in about 2% by volume.

The metal substrates were ultrasonically cleaned in acetone, hexane, and methanol, alkaline cleaned in the usual manner, rinsed with de-ionized water and blow-dried with hot air. Each substrate was dipped into the test solution for about 1 to about 5 minutes and dried, either at room temperature or with heat depending upon the particular ratios of the silanes and their concentrations in the solution, to form a coating or film on the metal substrate. The resulting silane coating had a thickness generally in the range of about 0.2 μm to about 0.6 μm after drying.

To perform the bonding tests, one inch on both ends of each silane-coated metal panel was masked to prevent that region from bonding to the rubber, leaving about one inch of coated metal in the unmasked, central portion of the panel available to bond to the rubber. A layer of an uncured rubber composition was placed on each metal panel. The composite article was then cured in a vulcanization press capable of up to 8 MPa pressure and at a temperature ranging from about 160° C. to about 175° C., for a period of time. After curing for about 10 to about 30 minutes, the bonded panels were aged for the time period specified (between 24 and 432 hours). Samples tested at 24 hr and 48 hr periods were subjected to a salt mist environment for the duration of the time, while samples tested at 132 hr, 300hr, and 432 hr were heated to about 70° C. for the duration of the testing period. Each sample was then tested by the ASTM 429-B test method using Instron test equipment (Instron Tester, Model No. 4465) at a jaw speed of about 2.54 cm per minute. The ASTM 429-B test is a vertical peel test that involves pulling non-bonded portions of each metal panel away from the cured rubber at 90O angles in opposing directions to measure the bond strength between the rubber and the metal. The "maximum force" (measured in lbs or Newtons) is the highest force that the bond was able to withstand before the rubber peeled away from the metal or before the rubber fractured and failed prior to peeling away. "Rubber coverage" is the percentage of rubber remaining on the bonded metal surface after peel testing. A "100% rubber coverage" means that the rubber completely failed with no portion of the rubber peeling away from the metal, and less than 100% means that a portion of the rubber clearly peeled from the surface of the metal. For example, a "90% rubber coverage" means the rubber failed before the bond failed and 90% of the rubber remained on the metal surface, while 10% clearly peeled away.

Example 1

Figure 2:
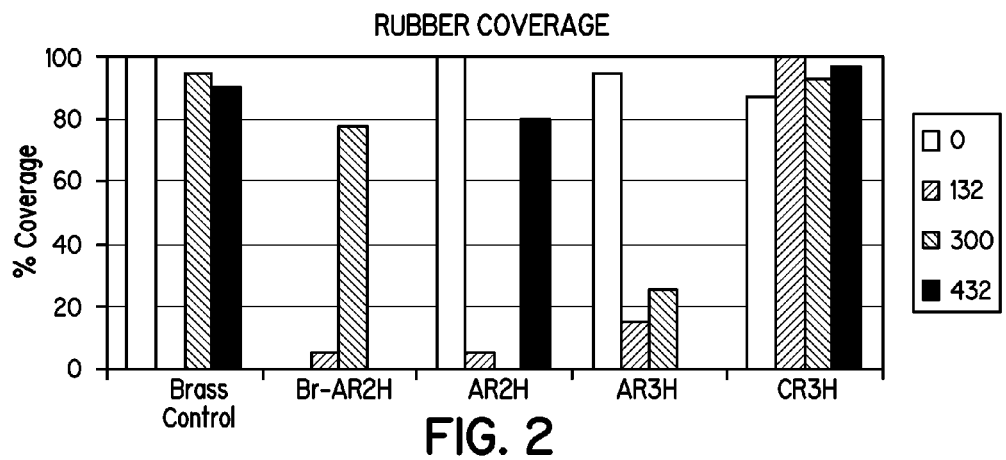
FIG. 2 is a bar graph illustrating rubber coverage of rubber-to-brass bonds utilizing silane compositions of the invention after an ASTM 429-B test.
Figure 3:
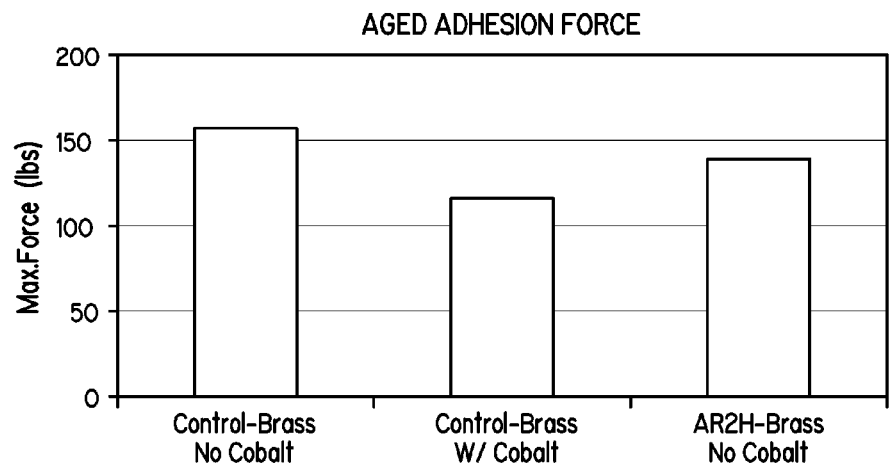
FIG. 3 is a bar graph illustrating the adhesion force of rubber-to-brass bonds with and without inclusion of cobalt in the rubber composition.

FIGS. 1, 2, and 3 illustrate the bonding results (maximum force and rubber coverage) between natural rubber and silane-coated brass metal panels subjected to the ASTM 429-B test after the following aging periods: 0 hours, 132 hours, 300 hours, and 432 hours, at 70° C. The "control" samples are blank, un-coated brass-metal panels.

FIGS. 1 and 2 illustrate beneficial concentration ratios between the aminosilane and the sulfur-containing silane as it relates to bond strength. As shown, ratios of about 1:1 to about 1:3 provide advantages in bond strength. Also, the silane solution C generally performed better than solution A in the ASTM 429-B tests. Solution C, i.e., the combination of substantially hydrolyzed Y9400 and A1589, provided as good or better bond strength and adhesion force as the control, but without the inclusion of cobalt additives in the rubber composition. Solution A, also provided good adhesion relative to the control sample, but without the inclusion of cobalt additives to the rubber composition. FIG. 3 illustrates the improved bonding strength provided by silane compositions of the invention for bonding brass to natural rubber compositions without cobalt adhesion promoting additives.

Example 2

Table I provides maximum force (lbs) and rubber coverage (%) results of natural rubber-to-metal bonds for zinc-plated brass metal panels subjected to the ASTM 429-B test after the aging period. The solutions were prepared and the tests were preformed in accordance with that described above.

TABLE I

| Silane Solution (5%) | Aging Period (hrs) | Cobalt (Yes/No) | Max. Force (lbs) | Rubber Coverage (%) |
|---|---|---|---|---|
| AR2H | 24 | Y | 14.5 | 0 |
| AR2H | 24 | N | 138.4 | 95 |
| CR3H | 24 | Y | 115.0 | 80 |
| CR3H | 24 | N | 170 | 85 |
| Control | 24 | Y | 175 | 100 |
| Control | 24 | N | 169.6 | 90 |
| AR2H | 48 | Y | 13.1 | 5 |
| AR2H | 48 | N | 133.7 | 80 |
| CR3H | 48 | Y | 41.8 | 10 |
| CR3H | 48 | N | 130.7 | 75 |
| Control | 48 | Y | 184.9 | 95 |
| Control | 48 | N | 140.2 | 85 |
| AR2H | 132 | Y | 40 | 5 |
| AR2H | 132 | N | 170.3 | 90 |
| AR3H | 132 | Y | 114.7 | 15 |
| CR3H | 132 | Y | 165.7 | 100 |
| CR3H | 132 | N | 145.9 | 100 |
| Control | 132 | N | 126.3 | 100 |
| AR2H | 300 | Y | 62.5 | 0 |
| AR2H | 300 | N | 153.9 | 95 |
| AR3H | 300 | Y | 132.4 | 25 |
| CR3H | 300 | Y | 167.8 | 95 |
| CR3H | 300 | N | 143.8 | 85 |
| Control | 300 | Y | 156.4 | 60 |
| Control | 300 | N | 133.8 | 95 |
| AR2H | 432 | Y | 72.03 | 80 |
| AR2H | 432 | N | 125.3 | 85 |
| CR3H | 432 | Y | 138.2 | 100 |
| CR3H | 432 | N | 148.3 | 100 |
| Control | 432 | Y | 147.9 | 100 |
| Control | 432 | N | 107.7 | 90 |

The discrepancies in the data reported above are due, in part, to the nature of the method of measuring adhesion. For example, many of the samples bent during testing and the adhesion was not very strong and could not be measured for such samples.

The results represented in the figures and table demonstrate some of the beneficial and unexpected results obtained by employing the silane compositions and methods of the present invention. As shown, substantially hydrolyzed mixtures of A1170 and A1289 containing nano-size particulate silica (test solutions A) and Y9400 and A1589 containing nano-size particulate silica (test solutions C), in varying ratios, provide adhesion which is surprisingly superior to that provided by the control samples (without any hydrolyzed silane solutions). The above results also indicate that the hydrolyzed silane solutions with nano-size particulate silica material allow for the elimination of cobalt adhesion promoters.

Accordingly, the silane compositions and methods of the present invention provide many advantages over comparable compositions and methods of the prior art. For example, the silane compositions of the invention containing nano-size particulate material, as a solution, was found to be more robust than previously known silane solutions. Moreover, such solutions were found to be less sensitive to vulcanization pressures than prior mixtures of non-hydrolyzed silanes. Particularly, the solutions are capable of bonding rubbers to metals with superior strength, and at vulcanization pressures lower than previously thought possible, due in part to thinner silane coatings which are less dependent on the vulcanization pressure. Thinner silane coatings reduce the amount of silane material needed thereby reducing the environmental impact, material wasted, and cost. Thus, the silane compositions and methods of the present invention provide advantages in the manufacture and commercialization of products with regard to costs, environmental issues, bond strength, and durability of rubber-to-metal bonds. These advantages would be very useful in the tire industry, especially since the brass panels tested and represented above simulate a brass-plated steel tire cord, and the zinc-plated brass panels tested and represented above simulate non-tire applications, such as zinc coated steel wire. Further, the present invention would also make possible the replacement of brass plated steel cords with galvanized or other plated metal surfaces on the tire steel cord thereby eliminating the need for cyanide-based tire cord plating processes.

While the present invention has been illustrated by a description of the embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention in its broader aspects is not limited to the specific details and representative apparatus and method, and illustrative examples shown and described. Accordingly, departures may be made from such details without departing from the spirit or scope of the applicants' general inventive concept.

What is claimed is:

1. A method of bonding rubber to a metal substrate, the method comprising:
   mixing a bis amino-silane with a first aqueous-based medium containing a nanosize particulate material to substantially hydrolyze the bis amino-silane;
   mixing a bis sulfur-containing silane with a second aqueous-based medium containing a nanosize particulate material to substantially hydrolyze the bis sulfur-containing silane;
   mixing the substantially hydrolyzed bis amino-silane with the substantially hydrolyzed sulfur-containing silane to form a silane solution comprising the substantially hydrolyzed bis amino-silane, the substantially hydrolyzed bis sulfur-containing silane, and the nanosize particulate materials of the first and second aqueous-based media, wherein the silane solution comprises a ratio of the hydrolyzed bis amino-silane to the hydrolyzed bis sulfur-containing silane of about 1:1 by volume;

applying the silane solution to at least a portion of a surface of the metal substrate;

drying the silane solution on the metal substrate to form a coating having a thickness in the range from about 0.1 μm to about 1 μm thereon; and applying an uncured, sulfur curable rubber onto the surface of the metal substrate having the coating thereon and sulfur curing the rubber to bond the rubber to the coated metal substrate;

wherein the bis amino-silane is a compound of the general formula I:

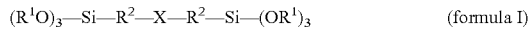

$(R^1O)_3—Si—R^2—X—R^2—Si—(OR^1)_3$ (formula I)

wherein: each $R^1$, independently, is selected from the group consisting of a $C_1$-$C_{20}$ alkyl and $C_2$-$C_{20}$ acyl; each $R^2$, independently, is selected from the group consisting of a substituted or unsubstituted aliphatic and aromatic group; and X is selected from —$N(R^3)$—, wherein $R^3$ is selected from the group consisting of hydrogen, substituted or unsubstituted, straight, branched or cyclic $C_1$-$C_{20}$ alkyl, alkenyl, and alkynyl groups and substituted or unsubstituted $C_3$-$C_{20}$ aryl and alkylaryl groups;

wherein the bis sulfur-containing silane is a compound of the general formula II:

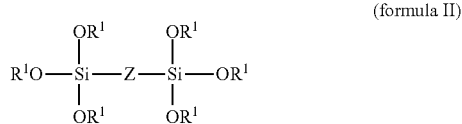

(formula II)

wherein: each $R^1$, independently, is selected from the group consisting of substituted or unsubstituted, straight, branched or cyclic $C_1$-$C_{20}$ alkyl, alkenyl, alkynyl, and acetyl groups and substituted or unsubstituted $C_3$-$C_{20}$ aryl and alkylaryl groups; Z is -Q-$S_x$-Q-, wherein each Q, independently, is an aliphatic or aromatic group; and x is an integer from 4-10; and wherein the nanosize particulate material is silica.

2. The method of claim 1 wherein the aqueous-based medium comprises water and alcohol.

3. The method of claim 1 wherein the bis amino-silane is bis(trimethoxysilylpropyl) amine.

4. The method of claim 1 wherein the bis sulfur-containing silane is bis(triethoxysilylpropyl) tetrasulfide.

5. The method of claim 1 wherein applying the solution to the metal substrate comprises dipping the metal substrate in the solution.

6. The method of claim 1 wherein the nanosize particulate material has an average particle size of about 0.1 μm or less.

7. The method of claim 1 wherein the nanosize particulate material is in a concentration range from about 10 ppm to about 1% by weight of the solution.

8. The method of claim 1 wherein the nanosize particulate material is in a concentration range from about 50 ppm to about 1000 ppm of the solution.

9. The method of claim 1 wherein drying comprises heating the silane solution on the metal substrate to a temperature of at least about 60° C.

10. The method of claim 1 wherein the coating formed has a thickness in the range from about 0.2 μm to about 0.6 μm.

11. The method of claim 1 wherein curing comprises applying heat and pressure to the rubber and coated metal substrate to form a bond therebetween.

12. The method of claim 1 wherein the sulfur curable rubber is selected from the group consisting of natural rubber, synthetic rubber, and combinations thereof.

13. The method of claim 1 wherein the bis amino-silane is bis(trimethoxysilylpropyl) amine and the bis sulfur-containing silane is bis(triethoxysilylpropyl) tetrasulfide.

14. A bonded tire cord prepared by the method of claim 1.

15. A method of bonding rubber to a metal substrate, the method comprising:

mixing a bis amino-silane with a first aqueous-based medium containing a nanosize particulate material to substantially hydrolyze the bis amino-silane;

mixing a bis sulfur-containing silane with a second aqueous based-medium containing a nanosize particulate material to substantially hydrolyze the bis sulfur-containing silane;

mixing the substantially hydrolyzed bis amino-silane with the substantially hydrolyzed sulfur-containing silane to form a silane solution comprising the substantially hydrolyzed bis amino-silane, the substantially hydrolyzed bis sulfur-containing silane, and the nanosize particulate materials of the first and second aqueous-based media, wherein the silane solution comprises a ratio of the hydrolyzed bis amino-silane to the hydrolyzed bis sulfur-containing silane of about 1:1 by volume;

applying the silane solution to at least a portion of a surface of the metal substrate;

drying the silane solution on the metal substrate to form a coating having a thickness in the range from about 0.1 μm to about 1 μm thereon; and applying an uncured, sulfur curable rubber onto the surface of the metal substrate having the coating thereon and sulfur curing the rubber with heat and pressure to bond the rubber to the coated metal substrate;

wherein the bis amino-silane is a compound of the general formula I:

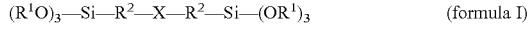

$(R^1O)_3—Si—R^2—X—R^2—Si—(OR^1)_3$ (formula I)

wherein: each $R^1$, independently, is selected from the group consisting of a $C_1$-$C_{20}$ alkyl and $C_2$-$C_{20}$ acyl; each $R^2$, independently, is selected from the group consisting of a substituted or unsubstituted aliphatic and aromatic group; and X is selected from —$N(R^3)$—, wherein $R^3$ is selected from the group consisting of hydrogen, substituted or unsubstituted, straight, branched or cyclic $C_1$-$C_{20}$ alkyl, alkenyl, and alkynyl groups and substituted or unsubstituted $C_3$-$C_{20}$ aryl and alkylaryl groups;

wherein the bis sulfur-containing silane is a compound of the general formula II:

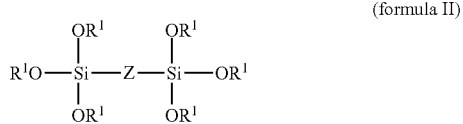

(formula II)

wherein: each $R^1$, independently, is selected from the group consisting of substituted or unsubstituted, straight, branched or cyclic $C_1$-$C_{20}$ alkyl, alkenyl, alkynyl, and acetyl groups and substituted or unsubstituted $C_3$-$C_{20}$ aryl and alkylaryl groups; Z is -Q-$S_x$-Q-, wherein each Q, independently, is an aliphatic or aromatic group; and x is an integer from 4-10; and wherein the nanosize particulate material is silica having an average particle size of about 0.1 μm or less.

16. A tire cord comprising: sulfur curable rubber, a metal substrate, and an adhesive film therebetween bonding the rubber to the metal substrate;

wherein the adhesive film has a thickness in the range from about 0.1 μm to about 1 μm and is formed from a dried silane solution comprising a substantially hydrolyzed bis amino-silane, a substantially hydrolyzed bis sulfur-containing silane, and a nanosize particulate material;

wherein the solution prior to drying is formed by:

mixing a bis amino-silane with a first aqueous-based medium containing a nanosize particulate material to substantially hydrolyze the bis amino-silane;

mixing a bis sulfur-containing silane with a second aqueous-based medium containing a nanosize particulate material to substantially hydrolyze the bis sulfur-containing silane; and mixing the substantially hydrolyzed bis amino-silane with the substantially hydrolyzed sulfur-containing silane to form a silane solution comprising the substantially hydrolyzed bis amino-silane, the substantially hydrolyzed bis sulfur-containing silane, and the nanosize particulate materials of the first and second aqueous-based media, wherein the silane solution comprises a ratio of the hydrolyzed bis amino-silane to the hydrolyzed bis sulfur-containing silane of about 1:1 by volume;

wherein the bis amino-silane is a compound of the general formula I:

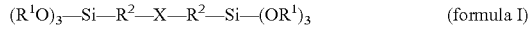    (formula I)

wherein: each R1, independently, is selected from the group consisting of a $C_1$-$C_{20}$ alkyl and $C_2$-$C_{20}$ acyl; each $R^2$, independently, is selected from the group consisting of a substituted or unsubstituted aliphatic and aromatic group; and X is selected from —N($R^3$)—, wherein $R^3$ is selected from the group consisting of hydrogen, substituted or unsubstituted, straight, branched or cyclic $C_1$-$C_{20}$ alkyl, alkenyl, and alkynyl groups and substituted or unsubstituted $C_3$-$C_{20}$ aryl and alkylaryl groups;

wherein the bis sulfur-containing silane is a compound of the general formula II:

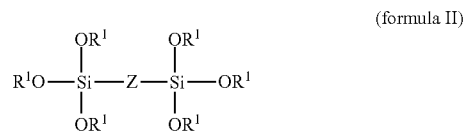    (formula II)

wherein: each $R^1$, independently, is selected from the group consisting of substituted or unsubstituted, straight, branched or cyclic $C_1$-$C_{20}$ alkyl, alkenyl, alkynyl, and acetyl groups and substituted or unsubstituted $C_3$-$C_{20}$ aryl and alkylaryl groups; Z is -Q-$S_x$-Q-, wherein each Q, independently, is an aliphatic or aromatic group; and x is an integer from 4-10; and wherein the nanosize particulate material is silica.

17. The tire cord of claim 16 wherein the rubber is selected from the group consisting of natural rubber, sulfur-cured rubber, peroxide-cured rubber, EPDM, NBR, SBR, and combinations thereof.

18. The tire cord of claim 16 wherein the substrate comprises a metal selected from the group consisting of zinc, steel, stainless steel, titanium, nickel, brass, copper, tin, aluminum, cobalt, alloys thereof, and combinations thereof.

* * * * *